Sept. 5, 1950     L. J. MOORE     2,521,018
SCRAPER, INCLUDING A PAIR OF SEPARABLY CONNECTED ARMS
FOR CLEANING THE INSIDE SURFACES OF A DEEP FAT FRYER
Filed Oct. 16, 1947
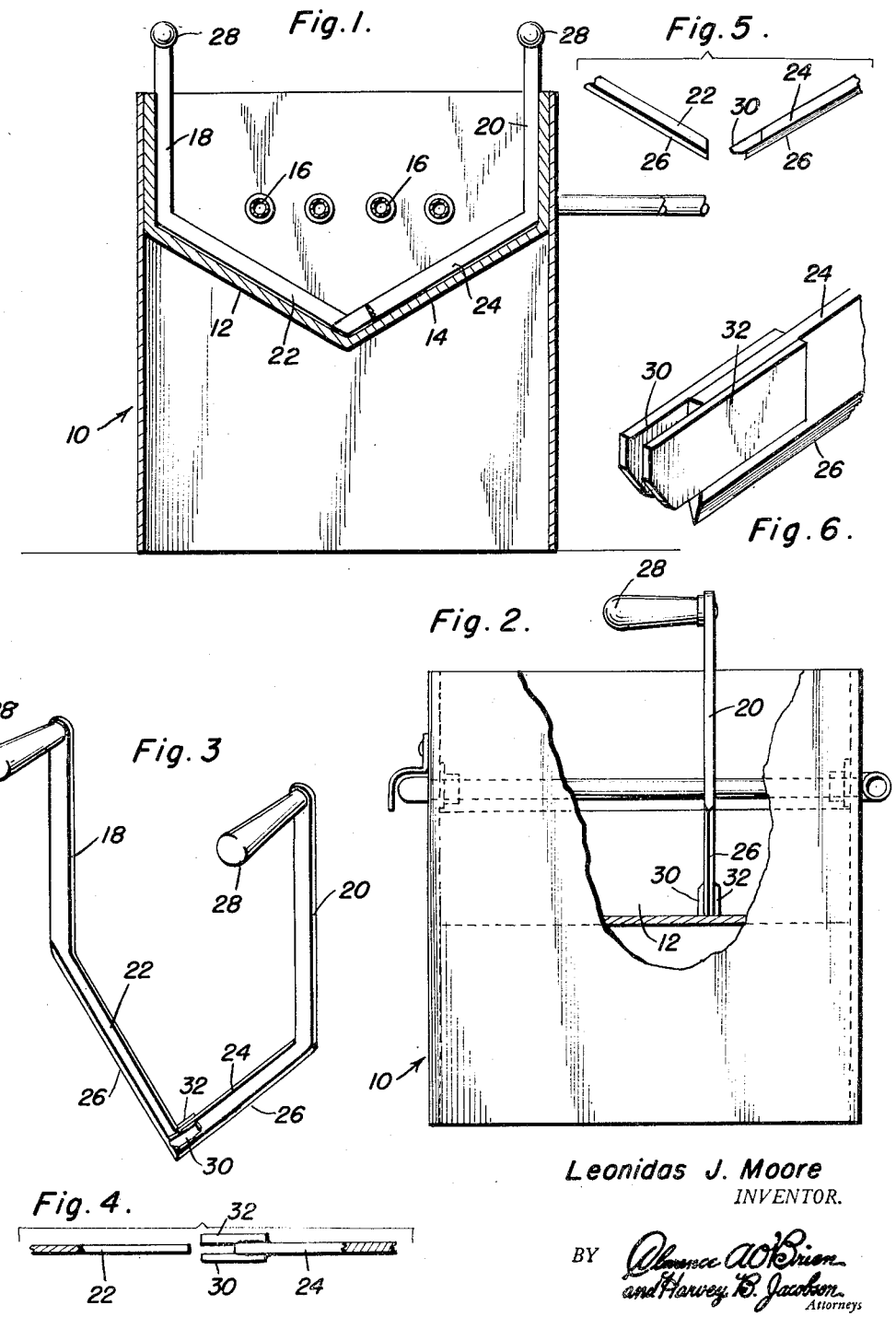
Leonidas J. Moore
INVENTOR.

Patented Sept. 5, 1950

2,521,018

UNITED STATES PATENT OFFICE 2,521,018

SCRAPER, INCLUDING A PAIR OF SEPARABLY CONNECTED ARMS FOR CLEANING THE INSIDE SURFACES OF A DEEP FAT FRYER

Leonidas J. Moore, New Bern, N. C.

Application October 16, 1947, Serial No. 780,196

3 Claims. (Cl. 15—236)

This invention appertains to novel and useful improvements in attachments or devices for deep fat fryers.

An object of this invention is to scrape or clean the internal surfaces of a deep fat fryer, while it is still hot. When the grease has been drained from the fryer, this device is then inserted into the fryer and jointed together so that the sediment may be scraped from the bottom and sides of the fryer.

Another object of this invention is to provide means for carrying out the above mentioned function.

A further purpose of this invention is to provide a pair of angular bends, conforming to the conventional internal surfaces of a deep fat fryer and means for frictionally locking the said arms relative to each other and in detachable relation.

Another purpose of this invention is to provide cutting or scraper means on said arms.

A further object of this invention is to provide an extremely inexpensive and simple device of the character described for the purposes set forth.

Other objects and features of novelty will become apparent to those skilled in the art, in following the description of the preferred form of the invention, illustrated in the accompanying drawing, wherein:

Figure 1 is a sectional view of the invention, showing the same in use;

Figure 2 is an elevational side view of the invention, showing the same in use with a conventional deep fat fryer, portions of the fryer being broken away to illustrate details of construction;

Figure 3 is a perspective view of the invention;

Figure 4 is a sectional view of the invention shown in Figure 3, showing the same in a separated position;

Figure 5 is a side view of the detail of construction shown in Figure 4, and;

Figure 6 is an enlarged perspective view of the clamp forming part of the present invention.

Referring now in detail to the illustrated preferred form of invention, like characters of reference are used throughout to indicate similar elements. Heretofore deep fat fryers were cleaned periodically by draining the grease therefrom and then using what kitchen tools that best could be utilized. Utility of the present invention renders the cleaning of deep fat fryers simpler, easy, dextrous, without waiting for the fryer to be cooled. When the grease is drained through a suitable valve this device is placed into the fryer sectionally, jointed together by the friction means and the cleansing operation performed. Then the grease supply may be replenished for further cooking.

A conventional deep fat fryer is generally indicated at 10 and has the usual inclined walls 12 and 14 forming the receptacle portion thereof. Heating coils 16 extend longitudinally of the fryer 10 as is conventional and are spaced from the receptacle walls 12 and 14.

Referring now primarily to Figure 3 there is clearly disposed a pair of arms 18 and 20, which arms have bent portions 22 and 24 respectively associated therewith. These bent portions obviously conform to the interior surfaces of the receptacle in the deep fat fryer. Scraper or cutting means in the form of knife or bevelled edges 26 are provided in association with the said bent portions 22 and 24. If found desirable, the bevelled edges may also extend partially up the arms 18 and 20 in order to clean the side portions of the receptacle.

Any suitable handle or grasping means may be provided such as bending the top portions of the said arms 18 and 20 or as disclosed, wooden handles, which are non-conductive (relatively) of heat may be used as seen at 28 in Figures 2 and 3.

In order to join the arms 18 and 20 within the receptacle, it is necessary that both arms be readily attachable and detachable after insertion in the said receptacle. To this end, a pair of plates 30 and 32 respectively are secured to a selected arm 20, on each face thereof. The ends of the said angular portions 22 and 24 respectively are bevelled in order that a point is formed at the lowermost portion of the invention when the angular portion 22 is inserted between the plates 30 and 32 respectively. Of course, friction retains the said arms 18 and 20 in the proper fixed position and due to the type of clamp utilized, a pivotal movement of the arms 18 and 20 may be effected for applying force on one side of the receptacle (as on the wall 12) independent of this additional force on the opposite inclined receptacle wall 14.

Due to the extreme simplicity achieved by this invention, a further description thereof is deemed unnecessary. However, it is apparent that variations may be made such as changes in size and shape without departing from the spirit of the invention. Accordingly, limitation is sought only in accordance with the scope of the following claims.

Having described the invention, what is claimed as new is:

1. In a cleaning device for deep fat fryers, a first and a second arm, scraping means formed on edges of said arms, a pair of spaced plates secured to said first arm and extending from one end of said first arm, said second arm having one end slidably insertable and disposed between said plates, this end of said second arm being held between said plates by the frictional bond between said end of said second arm and said plates, and said arms having angular terminal faces engaging each other.

2. For use with a receptacle having sides, a bottom, and heating elements attached to at least one of said sides and spaced from and extending over the bottom; a cleaning device comprising a pair of arms each provided with an outer and an inner edge, a scraper formed on each outer edge and adapted to be disposed on the inner face of the bottom of the receptacle, fastening elements at the ends of said scrapers separably connecting said scrapers, whereby the scrapers may be inserted in the receptacle below the heating elements and then fixed together, and so that the scrapers may be removed from the receptacle after scraping the bottom of the receptacle.

3. For use with a receptacle having sides, a bottom, and heating elements attached to at least one of said sides and spaced from and extending over the bottom; a cleaning device comprising a pair of arms each provided with an outer and an inner edge, a scraper formed on each outer edge and adapted to be disposed on the inner face of the bottom of the receptacle, fastening elements at the ends of said arms separably connecting said arms, whereby the arms may be inserted in the receptacle below the heating elements and then fixed together, said fastening elements including a pair of plates fixed to one of said arms at one end thereof, said plates being spaced from each other to form a pocket, and one end of the other arm being slidably insertable between said plates and releasably held by friction between said plates and the said one end of the other arm between said plates.

LEONIDAS J. MOORE.

REFERENCES CITED

The following references are of record in the file of this patent:

UNITED STATES PATENTS

| Number | Name | Date |
|---|---|---|
| 647,676 | Laverack | Apr. 17, 1900 |
| 1,133,168 | Colson | Mar. 23, 1915 |
| 1,440,542 | Katzinger | Jan. 2, 1923 |
| 1,560,441 | Trosper | Nov. 3, 1925 |
| 1,618,097 | Leiser | Feb. 15, 1927 |
| 1,728,087 | Stuart | Sept. 10, 1929 |